Patented Aug. 30, 1938

2,128,511

UNITED STATES PATENT OFFICE 2,128,511

PROCESS OF PREPARING META-NITRO-PARA-TOLUIDINE

Charles B. Biswell and Walter V. Wirth, Woodstown, N. J., assignors to E. I. du Pont de Nemours & Company, Wilmington, Del., a corporation of Delaware No Drawing. Application October 2, 1936, Serial No. 103,696

4 Claims. (Cl. 260—578)

This invention relates to the manufacture of m-nitro-p-toluidine, and especially to the manufacture of m-nitro-acyl-p-toluidines from which m-nitro-p-toluidine is produced by hydrolysis of the acyl group.

Heretofore m-nitro-p-toluidine has been made by nitrating N-acetyl-p-toluidine in a sulphuric acid suspension medium of relatively high sulphuric acid concentration, say about 93%, and thereafter hydrolyzing the acetyl group. It has also been made in sulphuric acid suspension media of relatively low sulphuric acid concentration. Both of these processes give extremely low yields of the product due to the formation of excessive amounts of oxidation products and ortho-isomers. According to another process, finely powdered N-acetyl-p-toluidine is fed into a sulphuric acid suspension medium of low concentration, say 40% sulphuric acid at the start of the process, and the concentration of the acid is increased during the process to a maximum which does not exceed 78% in any instance. While this process gives somewhat better yields than the other, when an extremely finely powdered N-acetyl-p-toluidine is fed into the sulphuric acid suspension medium, it produces a considerable quantity of the ortho isomer and decomposition products are formed which are difficult and costly to separate from the meta isomer. The heat generated in this acid reaction medium and the concentrations of the acids obtained in the process result in objectionable oxidation products. A thickening of the reaction mass occurs when the nitrated mass crystallizes and difficulties in stirring are encountered. The addition of strong sulphuric acid to the relatively dilute reaction mass for increasing the sulphuric acid concentration of the acid suspension medium results in the liberation of a great deal of heat which requires the use of large amounts of cooling material and processing in small batches, and great care is necessary in feeding the finely powdered N-acetyl-p-toluidine into the reaction medium to avoid agglomeration, overheating and decomposition. Among other objections to the process which contribute to the cost of the product and affect its purity is the necessity of using during nitration such low sulphuric acid concentrations that low-cost nitrating apparatus, such as cast iron, cannot be used economically because of serious acid corrosion. Therefore, it is desirable to provide better and less costly methods of manufacturing m-nitro-p-toluidine.

It is an object of the invention to provide improved methods of manufacturing m-nitro-p-toluidine ($CH_3:NO_2,1:3:4$) of high purity and in good yield. Another object is to provide processes which can be operated in apparatus constructed of inexpensive materials, such as cast iron nitrators. Another object is to provide processes in which the minimum amounts of undesired isomers and decomposition products are produced. Another object of the invention is to provide methods which permit of the processing of large batches and the use of simple stirring devices. Another object of the invention is to provide methods during the course of which only small amounts of heat are produced, and relatively small and inexpensive cooling means is required. These and other objects of the invention will be apparent from the following description.

The objects of the invention are accomplished generally by dissolving an N-acyl-p-toluidine, for example N-acetyl-p-toluidine ($CH_3:NH:COCH_3,1:4$)

in concentrated sulphuric acid, say 98% acid. The solution is cooled and diluted until a finely divided suspension of the toluidine derivative is produced and an acid concentration is reached which, upon adding the nitrating acid, will generate only a small amount of heat. This provides for carrying out the nitration in a medium in which the concentration is not diminished or is diminished only a small amount, and without the production of a large amount of heat. By carrying out the process in reaction media of constant or slightly diminishing acid concentration and in acid media of suitably high concentration, it has been found that a minimum of ortho-isomer and decomposition products are produced, stirring and cooling are easily maintained, large batches can be worked and high yields of the meta-compound of excellent purity are produced. By the term N-acyl-p-toluidines is meant the para toluidines represented by the formula $CH_3.C_6H_4.NH.CO$—R in whch R stands for a saturated acyclic aliphatic radical.

The following examples are mentioned to illustrate the invention but the invention is not limited thereto

Example I 500 lbs. of ground N-acetyl-p-toluidine ($CH_3:NH.COCH_3,1:4$) were dissolved in 2025 lbs. of 95% sulphuric acid, keeping the temperature between about 20° and about 30° C. The solution was cooled to 12° C. and 382 lbs. of ice were added, keeping the temperature below about 20° C. During the addition of ice the N-acetyl-p-toluidine partially precipitated. The suspension thus produced was easily stirred and the concentration of the sulphuric acid was about 80%.

675 lbs. of mixed acid (41.8% $H_2SO_4$, 36.0% $HNO_3$, 22.2% $H_2O$) were gradually added at a rate such that the temperature was maintained at about 20° to 22° C. The mass was stirred for about 15 minutes after the mixed acid was added and was then drowned in 10,000 lbs. of cold water, keeping the temperature between 5° and 8° C. The precipitate of m-nitro-acetyl-p-toluidine was filtered from the liquor and washed free of acid.

The acid material was treated with caustic soda to hydrolyze the acetyl group. The m-nitro-p-toluidine (3-nitro-4-amino-toluene) thus produced was of excellent quality. The yield produced by hydrolysis was 77 to 81%, depending upon the method of hydrolysis employed.

*Example II*

500 lbs. of finely crushed or flaked N-acetyl-p-toluidine were dissolved in 2000 lbs. of 95% sulphuric acid at 20°–30° C. The solution was cooled to 12° C. and 405 lbs. of ice were added to drop the sulphuric acid concentration to 79%. The temperature was kept below 20° C. 666 lbs. of mixed acid (36.4$HNO_3$, 56.7$H_2SO_4$, 6.9$H_2O$) were gradually run in at such a rate that the temperature was maintained at about 20° to about 22° C. with an external cooling medium. The mass was stirred for 15 to 20 minutes after the mixed acid was added. It is then worked up as described in Example I.

In order to provide a solution of the N-acyl-p-toluidine in which a suspension of finely divided particles of the toluidine derivative can be produced at nitrating temperatures and at the same time maintain a sufficiently high acid concentration for nitration, sulphuric acid above about 90% strength is necessary. At the beginning of nitration concentrations of about 79% to 80% sulphuric acid are preferred but higher and lower concentrations can be used, for example concentrations as much as about 3% higher or lower. At the start of nitration, the preferred concentration is above 78%. However the concentration of sulphuric acid at the beginning, during and at the end of nitration should be at least 76% to avoid foaming, attack on the nitrator and stirring equipment, and undue formation of undesirable isomers and oxidation products. In cases where the concentration of the acid is decreased, we prefer to maintain the change within about 6% to minimize the heat generated and the effects resulting therefrom. The term, about 80% as used in the specification and claims means the concentrations within the range indicated, and the term, concentrated sulphuric acid means concentrations of about 90% or more.

During the nitration temperatures of 20° C. to 22° C. give the best results. Higher and lower temperatures giving slightly lower yield, and shorter or longer periods for reaction, as the case may be, can be used as will be understood by those skilled in the art. Temperatures of about 21° C., that is to say temperatures which do not vary more than about 3° C. above or below 21° C. are preferred and the term, about 21° C. is used in the claims to indicate this range of temperature.

N-acetyl-p-toluidine is mentioned in the examples as a suitable basic material to be operated upon, but the other N-acyl-p-toluidines can be used, such as N-formyl-p-toluidine and N-propionyl-p-toluidine. Granular, crushed or flaked material of fine or coarse particle size can be used with equal success.

The water formed during nitration tends to lower the sulphuric acid concentration of the reaction medium but it is unnecessary to use anhydrous mixed acid. Some water may be present in the mixed acid depending on its proportions of nitric and sulphuric acid and the amount of material to be nitrated. An excess of nitric acid over that which is combined with the toluidine is desirable, say 15% but more or less can be used. Consequently a wide variation in the proportions of nitric acid, sulphuric acid and water in the nitrating acid can be used. Thus the proportions of the constituents in the mixed acids can be ascertained from the fixed conditions of the process heretofore explained.

In carrying out the processes of the invention, it has been found that large batches can be nitrated conveniently producing products of high purity, and that excellent nitrations can be made within the preferred ranges of temperature and acid concentration with cast iron nitrating and stirring apparatus.

From the foregoing description it will be evident that many variations may be made without departing from the spirit and scope of the invention and it is to be understood that no limitations are intended in the annexed claims except those which are specifically expressed or are imposed by the prior art.

We claim:

1. The process which comprises diluting and cooling a sulphuric acid solution of N-acetyl-p-toluidine until a precipitate is produced between 12° and 20° C. and the concentration of the acid in said suspension is about 80%, mono-nitrating by adding to said suspension a quantity of mixed nitric and sulphuric acids containing an excess of nitric acid over that utilized for mono-nitration and sufficient sulphuric acid to produce a sulphuric acid concentration at the end of nitration as referred to the water and sulphuric acid content of the mixture which is not lower than 76% and not above the concentration of sulphuric acid in said suspension, and maintaining the temperature between 18° and 24° C. during nitration.

2. The process which comprises diluting a sulphuric acid solution of N-acetyl-p-toluidine until a precipitate is produced at a temperature between 12° and 20° C. and the concentration of sulphuric acid in said suspension is between 76% and 82%; and mono-nitrating by gradually adding a quantity of mixed acid containing about 36% nitric acid, about 40% to about 60% sulphuric acid and the remainder water whilst maintaining the temperature between 18° and 24° C., said quantity of mixed acid being sufficient to produce a concentration of sulphuric acid at the end of nitration as referred to the water and sulphuric acid content of the mixture which is not lower than 76% and not above the concentration of sulphuric acid in said suspension.

3. The process which comprises diluting and cooling 2025 parts of 95% sulphuric acid which contains in solution 500 parts of N-acetyl-p-toluidine until a precipitate is produced at a temperature between 12° and 20° C. and the concentration of sulphuric acid in said suspension is about 80%, and mono-nitrating by gradually adding a quantity of mixed acid containing 41.8% sulphuric acid, 36.0% nitric acid and 22.2% water, whilst maintaining the temperature at 20° to 22° C., said quantity of mixed acid being sufficient to produce a concentration of sulphuric acid at the end of nitration as referred to the water and sulphuric acid content of the mixture which is not lower than 76% and not above the concentration of sulphuric acid in said suspension.

4. The process which comprises diluting and cooling a solution of 500 parts N-acetyl-p-toluidine in 2000 parts of 95% sulphuric acid until a precipitate is produced at a temperature between 12° and 20° C. and the concentration of the sulphuric acid in said suspension is 79%, and mononitrating by adding a quantity of mixed acid containing 36.4% nitric acid, 56.7% sulphuric acid and 6.9% water whilst maintaining the temperature at about 20° to 22° C., said quantity of mixed acid being sufficient to produce a concentration of sulphuric acid at the end of nitration, which is substantially that of the concentration of sulphuric acid in said suspension.

CHARLES B. BISWELL.
WALTER V. WIRTH.

CERTIFICATE OF CORRECTION.

Patent No. 2,128,511.　　　　　　　　　　　　　　　　August 30, 1938.

CHARLES B. BISWELL, ET AL.

It is hereby certified that error appears in the printed specification of the above numbered patent requiring correction as follows: Page 1, second column, line 1, for the formula "$(CH_3:NO_2,1:3:4)$" read $(CH_3:NO_2:NH_2,1:3:4)$; and that the said Letters Patent should be read with this correction therein that the same may conform to the record of the case in the Patent Office.

Signed and sealed this 11th day of October, A. D. 1938.

Henry Van Arsdale (Seal)

Acting Commissioner of Patents.